United States Patent [19]

Froyer et al.

[11] Patent Number: 5,266,172
[45] Date of Patent: Nov. 30, 1993

[54] PROCESS FOR THE SYNTHESIS OF SUBLIMABLE OLIGOMERS BASED ON PHENYLENE, LINEAR AND OF CONTROLLED LENGTH

[75] Inventors: Gérard Froyer; Yvan Pelous, both of Lannion; Emmanuelle Dall'arche, Rueil Malmaison; Claude Chevrot, St Germain en Laye; Alain Siove, Soisy Sous Montmorency, all of France

[73] Assignee: France Telecom, Paris, France

[21] Appl. No.: 720,907

[22] Filed: Jun. 25, 1991

[30] Foreign Application Priority Data

Jun. 27, 1990 [FR] France .................. 90 08091

[51] Int. Cl.$^5$ .................................. C25B 3/00
[52] U.S. Cl. ........................... 204/72; 204/59 R
[58] Field of Search ................... 204/72, 59 R

[56] References Cited

U.S. PATENT DOCUMENTS

| | | | |
|---|---|---|---|
| 4,836,574 | 9/1989 | Maurice et al. | 204/72 |
| 4,911,801 | 3/1990 | Pons | 204/59 R |
| 4,986,886 | 1/1991 | Wei et al. | 204/59 R |
| 5,069,823 | 12/1991 | Sato et al. | 204/59 R |

OTHER PUBLICATIONS

Chemical Abstract 109: 158525d Oct. 31, 1988.
Chemical Abstract 112: 127714x Apr. 2, 1990.
Schiavon et al "Coupling of organic halides electrocatalyzed by the $Ni^{II}/N^1/Ni^{0PPh}{}_3$ System" Journal of Chemical Society, Dalton Transactions vol. 5, 1981, pp. 1074-1081.

Primary Examiner—John Niebling
Assistant Examiner—Brian M. Bolam
Attorney, Agent, or Firm—Blakely, Sokoloff, Taylor & Zafman

[57] ABSTRACT

The present invention relates to a process for the preparation of sublimable oligomers based on phenylene, linear and of controlled length, by electrochemical coupling of two lower oligomers within a monocompartmental cell with three electrodes, in the presence of an organometallic catalyst, characterized in that it comprises:

1—electrolysis of the catalyst and its reaction with one of the two oligomers at a first potential,
2—reduction of the insertion species obtained according to step 1, and its reaction with a second oligomer at a second potential below the first potential, and
3—recovery of the sublimable oligomer so obtained, the two lower oligomers used being mono- or dihalogenated oligomers identical or different.

The present invention also relates to sublimable oligomers based on phenylene obtained by this process, and their uses in electronics and/or optics.

7 Claims, No Drawings

PROCESS FOR THE SYNTHESIS OF SUBLIMABLE OLIGOMERS BASED ON PHENYLENE, LINEAR AND OF CONTROLLED LENGTH

BACKGROUND OF THE INVENTION

The present invention relates to a process of the preparation of sublimable oligomers based on phenylene, which are linear and of controlled length.

Electroactive polymers like polyparaphenylene, show remarkable semi-conducting and optical properties, and constitute consequently, for the electronics industry, a preferred material.

However, their employment, by conventional methods presents real problems.

They are generally insoluble and infusible and consequently do not lend themselves to deposits effected under vacuum by the techniques which are customarily used in the electronics industry for the production of thin layers of semi-conductors, isolating materials and metallization, for example.

It is a particular object of the present invention to provide a process for the preparation of oligomers based on phenylene, which are sublimable.

The literature already takes into account various methods of preparing phenylene-based oligomers. However, none of them is totally satisfactory.

In the majority of cases, these methods only result in even homo-oligomers, which are moreover often mixed with metal salts and other compounds. Such mixtures are of course difficult to exploit, and require the employment of additional purification stages which considerably reduce the overall yield of the reaction.

As for the rare methods leading to odd oligomers, they employ a series of fastidious reactions which also affect the yield.

It is possible to mention more particularly two methods calling upon electrochemical means for the preparation of such oligomers or polymers. These methods are based on the dimerization of a monohalogenated oligomer in the presence of a metallic complex (J. PERICHON, Journal of Organometallic Chemistry, 303, (1986), p. 131) or the polymerization of dihalogenated oligomers also in the presence of a metal complex (J. F. FAUVARQUE, Makromol. Chim., 186, (1985), p. 1415). According to these methods, all of the reagents are introduced from the start of the reaction and the polymerization or dimerization performed in a single stage at a single reaction potential. It is obvious that under such conditions it is very difficult to modulate the reaction.

GENERAL DESCRIPTION OF THE INVENTION

According to the present invention there is provided a process for the preparation of sublimable oligomers based on phenylene, which are linear and of controlled length, by electrochemical coupling of two lower oligomers, within a mono-compartmental cell with three electrodes and in the presence of an organometallic catalyst characterized in that it comprises:
1—electrolysis of the catalyst and its reaction with one of the two oligomers at a first potential,
2—the reduction of the insertion species obtained according to step 1, and its reaction with the second oligomer at a second potential below the first potential, and
3—the recovery of the sublimable oligomer so obtained, the two lower oligomers used being mono or dihalogenated oligomers, identical or different.

The process according to the present invention has advantages with respect to the already known methods, due to the development in two stages of the electrochemical coupling. It enables the coupling of two oligomers based on phenylene, mono or dihalogenated, identical or different, but also the coupling of an oligomer based on monohalogenated phenylene with a mono or dihalogenated heterocyclic oligomer.

It is the precise knowledge of the catalytic mechanism which enables these two phases to be well separated, and to act on the potential parameter to modulate the coupling reaction.

In a first stage the electrolysis of the catalyst which is inserted in the carbon-halogen chemical bond of the first monohalogenated oligomer is effected. This leads to an insertion species stable in the medium at the potential of the operation used.

In a second stage, the reduction of this insertion species is effected which is made to react with the second oligomer. This second oligomer is only added to the medium at the end of the electrolysis of the catalyst. This second stage, namely the reduction of the insertion species and its reaction with the second oligomer is performed moreover at a potential below the first potential.

As regards the catalyst, it is selected so as to be reduced to a potential less cathodic than the halogenated oligomer of lower order, that is introduced into its presence in the medium at the beginning of the reaction. This catalyst is a halogenized salt of a transition metal, represented by the general formula I:

$$MX_2L \qquad \text{I}$$

in which M represents Ni, Cu, Co or Sn, X a halogen, in particular bromine, and L is a ligand of the bipyridine, triphenylphosphine, 1-10 phenanthroline, bisquinoleine, or 1.2 bis diphenylphosphinoethane type.

Preferably, it is a halogenized salt of a complex of nickel, and preferably of nickel bistriphenylphosphine.

According to the present invention, it is possible to employ a wide range of oligomers. These two oligomers may be selected independently of one another, among oligomers of phenylene, even or odd and mono- or dihalogenated, and mono- or dihalogenated heterocyclic oligomers.

The mono- or dihalogenated heterocyclic oligomers are preferable represented by the general formula II:

$$XR(X)n \qquad \text{II}$$

in which n represents 1 or 0, X a halogen and R a group selected from among N substituted carbazole, fluorene, bithiophene, pyridine, bipyridine, dibenzofuran and dibenzothiophene.

The process according to the invention enables the production of even or odd paraoligophenylenes from the homocoupling of two identical monohalogenated oligomers, the crossed homocoupling of two different monohalogenated oligomers, one even and the other odd for example, or again the coupling of a monohalogenated oligomer with a dihalogenated oligomer.

In the same way, it is possible to prepare certain oligomers based on phenylene by heterocoupling of an oligomer based on dihalogenated phenylene with a reduciable monohalogenated heterocyclic oligomer of the formula $XR(X)_n$.

Lastly, it is also possible to obtain certain oligomers based on heterocyclic compounds by heterocoupling between an oligomer of monohalogenated phenylene and a dihalogenated heterocyclic oligomer.

Of course, all of the oligomers obtained by the process of the present invention are sublimable.

The coupling method employed according to the present invention consists of using a monocompartmental electrochemical cell with three electrodes, a cathode, an anode and a reference electrode, and filled with an electrolyte constituted by an organic solvent or a mixture of solvent resistant to reduction.

As solvent there may be used DMA or again a mixture of two thirds tetrahydrofuran (THF), and a third of hexamethylphosphorotriamide (HMPT), acetonitrile and the substitution solvents of HMPT, like N,N-dimethylethylene urea (DMEU).

Preferably there is also added to the electrolyte an anhydrous salt medium of an ionic conductivity, not providing protons.

It can be a salt selected from the group $LiBF_4$, $LiCLO_4$, $NR_4BF_4$, with R representing a lower alkyl group, and preferably a butyl group.

The cathode is liquid and preferably based on mercury or a liquid metallic alloy. The anode or counteranode which is soluble is for example of magnesium or of lithium. As for the reference electrode, it is most frequently of silver/silver perchlorate or saturated calomel.

Thus according to one prefered embodiment of the process, into the electrochemical cell is introduced the catalyst and the first lower oligomer. The electrolysis potential is fixed so as to permit reduction of the catalyst.

At this potential, the reduced zero-valent metal is inserted in the carbon-halogen linkage, and it is possible to follow the development of the reduction of the metallic salt into metal 0 and through this fact the insertion by the variation of the current which passes through the cell as a function of time.

The second oligomer is then added and the coupling is performed by bringing the potential to a more cathodic value which is a function of the compounds introduced and of the nature of the catalyst, this second potential being less than the first potential.

At the end of the reaction, it suffices to perform a simple filtration and washing with solvents of the oligomers introduced to isolate the product of the reaction. The oligomer so obtained and dried under vacuum is sufficiently pure and linear to be directly sublimed without additional purification.

As previously mentioned, this material is very particularly useful in the electronics and/or optical industry. It can be deposited by sublimation so as to obtain layers of sublimed material, which can attain several thousands angstroms in thickness.

These layers of material are homogeneous and can receive in their turn, without returning to the atmosphere, other depositions under vacuum or undergo additional treatments.

The present invention relates also to oligomers based on phenylene which are linear and sublimable obtained by the process according to the invention.

It relates in addition to the uses of these oligomers in the electronics and/or optical industry. In electronics, for example: planarization, isolation (as a passive treatment) and suitably doped, use as a thin layer field effect semi-conductor transistor; in optics, for example: passive anti ultra-violet treatment or as an active material in the generation of a third harmonic.

Other advantages and features of the present invention will be apparent in reading the examples given below which are of course to be taken as being non limiting in nature.

DESCRIPTION OF PREFERRED EMBODIMENTS

EXAMPLE 1

Into an electrochemical cell with a single compartment and three electrodes containing a mixture of 70 ml THF (tetrahydrofuran) and 30 ml HMPT (hexamethylphotriamide), are introduced between $10^{-3}$ and $5\ 10^{-3}$ mole of $Ph_3Br$, as much $NiBr_2(PPh_3)_2$, an excess of the ligand $PPh_3$ (namely $10^{-2}$ mole) and a salt medium ($LiBF_4$).

It is placed at a potential $E_1 = -1.2$ V/ECS so as to reduce the $Ni^{2+}$ into $NI^0$ and to form the insertion species $Ph_3NiBr$. When the reaction is ended, the electrolysis current drops and the same amount of $Ph_2BR$ between ($10^{-3}$ and $5\ 10^{-3}$ mole) is added. The potential is fixed at $E_2 = -1.4$ V/ECS. The coupling is then effected and results in the precipitation of the oligomer $Ph_5$. The oligomer is filtered, washed several times with 5%. $H_2SO_4$ acidulated water, then with alcohol and acetone; it is lastly dried under vacuum.

EXAMPLE 2

Under the same conditions as for $Ph_5$, but by adding $Ph_3Br$ in a second step and by setting it at $E_2 = -1.4$ F V/ECS, the oligomer $Ph_6$ is obtained which is isolated and treated as previously.

EXAMPLE 3

With the same electrochemical cell containing 100 ml of DMA (dimethylacetamide) and a salt medium $NBu_4BF_4$, $Ph_3Br$ and the catalyst $NiBr_2(PPh_3)_2$, its ligand $PPh_3$ in excess in the same proportions as example 1, there is obtained by setting $E_1 = -1.2$ V/ECS, the insertion species $Ph_3NiBr$. Then to the medium is added an equivalent amount of 3 bromo N-ethyl-carbazole (from $10^{-3}$ to $5\ 10^{-3}$ mole) and the potential is fixed at $E_2 = -1.4$ to $-1.5$ V/ECS.

A precipitate is observed which corresponds to a fraction of the coupling oligomer terphenyl-N-ethyl-carbazole which is filtered and treated as previously. Another fraction can be isolated from the solution by precipitation in a large volume of 5% $H_2SO_4$ acidulated water, filtration of the oligomer and the usual processing.

EXAMPLE 4

Under the same conditions as in the preceding example with the same catalyst, but by using dppe (diphenylphosphino-ethane) as an excess ligand, the insertion species $Ph_3NiBr$ is obtained at $E_1 = -1.2$ V/ECS.

Then dibromo N ethyl carbazole is added to the medium in half the amount with respect to the starting $Ph_3Br$. It is set at $E_2 = -1.4$ to $-1.5$ V/ECS and the precipitation of the oligomer terphenyl-N-ethyl-carbazole-terphenyle is observed which is isolated and treated as indicated above.

We claim:

1. Process of the preparation of sublimable oligomers based on phenylene, linear and of controlled length, by electrochemical coupling of two lower oligomers, within a monocompartmental cell with three electrodes, in the presence of an organometallic catalyst characterized in that it comprises: 1—electrolysis of the catalyst and its reaction with one of the two oligomers at a first potential, 2—reduction of the insertion species obtained in step 1, and its reaction with the second oligomer at a second potential below the first potential, and 3—recovery of the sublimable oligomer so obtained, the two lower oligomers used being mono- or dihalogenated oligomers, identical or different.

2. Process according to claim 1, wherein the organometallic catalyst is selected so as to be reduced to a less cathodic potential than the oligomer in the presence of which it is electrolyzed.

3. Process according to claim 1, wherein the catalyst is a halogenized salt of a transition metal represented by the general formula I:

$$MX_2L \qquad \qquad I$$

in which M represents Ni, Cu, Co or Sn, X represents a halogen, in particular bromine, and L represents a ligand selected preferably from among the bipyridine, triphenylphosphine, 1-10-phenanthroline, bisquinoleine and 1.2 bis diphenylphosphinoethane groups.

4. Process according to claim 3, wherein the catalyst is a halogenized salt of a complex of nickel and preferably of nickel bistriphenylphosphine.

5. Process according to claim 1, wherein the two lower oligomers represent, independently of one another, a mono- or dihalogenated even or odd phenylene based oligomer or a mono- or dihalogenated heterocyclic oligomer.

6. Process according to claim 5, wherein the heterocyclic oligomer corresponds to the general formula II:

$$X-R-(X)_n \qquad \qquad II$$

in which X represents a halogen atom, n represents 0 or 1, and R a substituted N carbazole, bithiophene, pyridine, bipyridine, dibenzofuran or dibenzothiophene group.

7. Process according to claim 1, wherein the sublimable oligomer is isolated by simple filtration at the end of the reaction.

* * * * *